United States Patent
Sakai

(10) Patent No.: US 9,344,589 B2
(45) Date of Patent: May 17, 2016

(54) IMAGE PROCESSING APPARATUS, IMAGE PROCESSING METHOD, AND RECORDING MEDIUM

(71) Applicant: Norio Sakai, Kanagawa (JP)

(72) Inventor: Norio Sakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/612,895

(22) Filed: Feb. 3, 2015

(65) Prior Publication Data

US 2015/0222764 A1 Aug. 6, 2015

(30) Foreign Application Priority Data

Feb. 4, 2014 (JP) ................................. 2014-019136

(51) Int. Cl.
*G06F 3/12* (2006.01)
*H04N 1/32* (2006.01)
*H04N 1/00* (2006.01)

(52) U.S. Cl.
CPC .... *H04N 1/00214* (2013.01); *H04N 2201/0081* (2013.01)

(58) Field of Classification Search
None
See application file for complete search history.

(56) References Cited

U.S. PATENT DOCUMENTS

| | | | | | |
|---|---|---|---|---|---|
| 5,029,017 A | * | 7/1991 | Abe et al. | ....................... | 358/451 |
| 5,127,013 A | * | 6/1992 | Yoshida | ............. | H04N 1/00485 358/404 |
| 5,481,354 A | * | 1/1996 | Nakajima | .......... | G03G 15/6544 399/371 |
| 5,566,277 A | * | 10/1996 | Hideshima | ......... | G06K 15/1242 358/1.16 |
| 5,761,394 A | * | 6/1998 | Sugiura | ................ | H04N 1/0402 358/1.15 |
| 5,956,472 A | * | 9/1999 | Ishikawa | ................ | G06K 15/10 358/1.16 |
| 5,999,278 A | * | 12/1999 | Suzuki et al. | .................. | 358/512 |
| 6,108,107 A | * | 8/2000 | Suzuki | ..................... | H04N 1/03 348/E3.009 |
| 6,115,146 A | * | 9/2000 | Suzuki | ............... | H04N 1/02409 348/E5.045 |

(Continued)

FOREIGN PATENT DOCUMENTS

JP 2005-341419 12/2005
JP 2006-014214 1/2006

(Continued)

*Primary Examiner* — Madelein Nguyen
(74) *Attorney, Agent, or Firm* — Oblon, McClelland, Maier & Neustadt, L.L.P.

(57) ABSTRACT

An image processing apparatus includes an image data input unit reading an input image and acquiring input image data on a per line basis; an effective image data generation unit generating effective image data based on the input image data acquired by the image data input unit; an address generation unit generating addresses of transmission destinations of the input image data; an image data transmission unit transmitting the input image data to the transmission destinations designated by the addresses generated by the address generation unit; and an adjustment unit adjusting an operation of the image data transmission unit in a manner so that margin data can be transmitted in periods other than periods when effective image data are transmitted.

11 Claims, 18 Drawing Sheets

(56) References Cited

U.S. PATENT DOCUMENTS

| | | | | |
|---|---|---|---|---|
| 6,441,915 | B1* | 8/2002 | Imaizumi | H04N 1/047 358/1.1 |
| 6,539,120 | B1* | 3/2003 | Sita et al. | 382/233 |
| 6,707,569 | B1* | 3/2004 | Kato | H04N 1/00236 358/1.14 |
| 6,850,995 | B1* | 2/2005 | Shishizuka | H04N 1/00204 358/1.1 |
| 7,978,367 | B2* | 7/2011 | Matsuzawa | H04N 1/6033 347/251 |
| 8,139,255 | B2* | 3/2012 | Matsunaga | H04N 1/40068 358/1.16 |
| 8,248,668 | B2 | 8/2012 | Sakai | |
| 8,560,753 | B1* | 10/2013 | Hobbs | G06F 3/1454 345/2.1 |
| 9,098,509 | B1* | 8/2015 | Kapoor | G06F 17/30023 |
| 2002/0195496 | A1* | 12/2002 | Tsikos et al. | 235/462.01 |
| 2003/0011609 | A1* | 1/2003 | Deering et al. | 345/582 |
| 2003/0016379 | A1* | 1/2003 | Takahashi | B41J 2/2103 358/1.13 |
| 2003/0024987 | A1* | 2/2003 | Zhu | 235/454 |
| 2003/0086127 | A1* | 5/2003 | Ito et al. | 358/462 |
| 2003/0210334 | A1* | 11/2003 | Sarwari | 348/222.1 |
| 2004/0066363 | A1* | 4/2004 | Yamano et al. | 345/98 |
| 2007/0147673 | A1* | 6/2007 | Crandall | 382/128 |
| 2007/0285712 | A1* | 12/2007 | Komada | H04N 1/00204 358/1.15 |
| 2008/0002041 | A1* | 1/2008 | Chuang | H04N 9/3185 348/241 |
| 2009/0115798 | A1* | 5/2009 | Shimada | H04N 5/44504 345/621 |
| 2009/0135271 | A1* | 5/2009 | Kurane | H04N 5/2354 348/222.1 |
| 2009/0168109 | A1* | 7/2009 | Kishi | 358/3.27 |
| 2012/0050812 | A1* | 3/2012 | Takahashi | B41J 29/38 358/1.16 |
| 2012/0098960 | A1* | 4/2012 | Fujino et al. | 348/135 |
| 2013/0208006 | A1* | 8/2013 | Lord | G06T 11/00 345/633 |
| 2013/0229404 | A1* | 9/2013 | Ishida | G09G 5/006 345/212 |
| 2014/0218608 | A1* | 8/2014 | Stelliga | H04N 21/43635 348/441 |
| 2014/0340526 | A1* | 11/2014 | Miura | H04N 17/002 348/175 |
| 2015/0243719 | A1* | 8/2015 | Kwon | H01L 27/1248 257/43 |
| 2015/0264298 | A1* | 9/2015 | Colenbrander | H04N 7/013 345/547 |
| 2015/0269891 | A1* | 9/2015 | Yamazaki | G09G 3/344 345/107 |
| 2015/0312504 | A1* | 10/2015 | Aldridge | H04N 5/3743 348/157 |
| 2015/0378479 | A1* | 12/2015 | Hayashi | G06F 3/0416 345/174 |

FOREIGN PATENT DOCUMENTS

| | | |
|---|---|---|
| JP | 2008-078939 | 4/2008 |
| JP | 2008-289021 | 11/2008 |
| JP | 2009-296352 | 12/2009 |

* cited by examiner

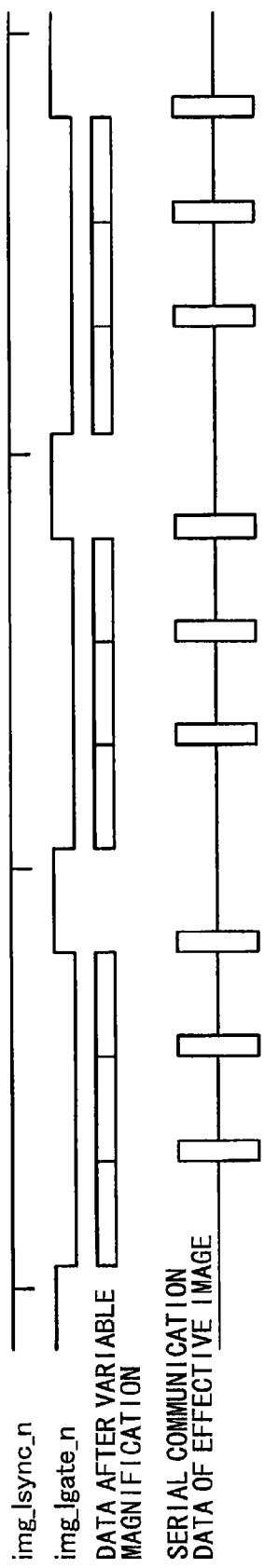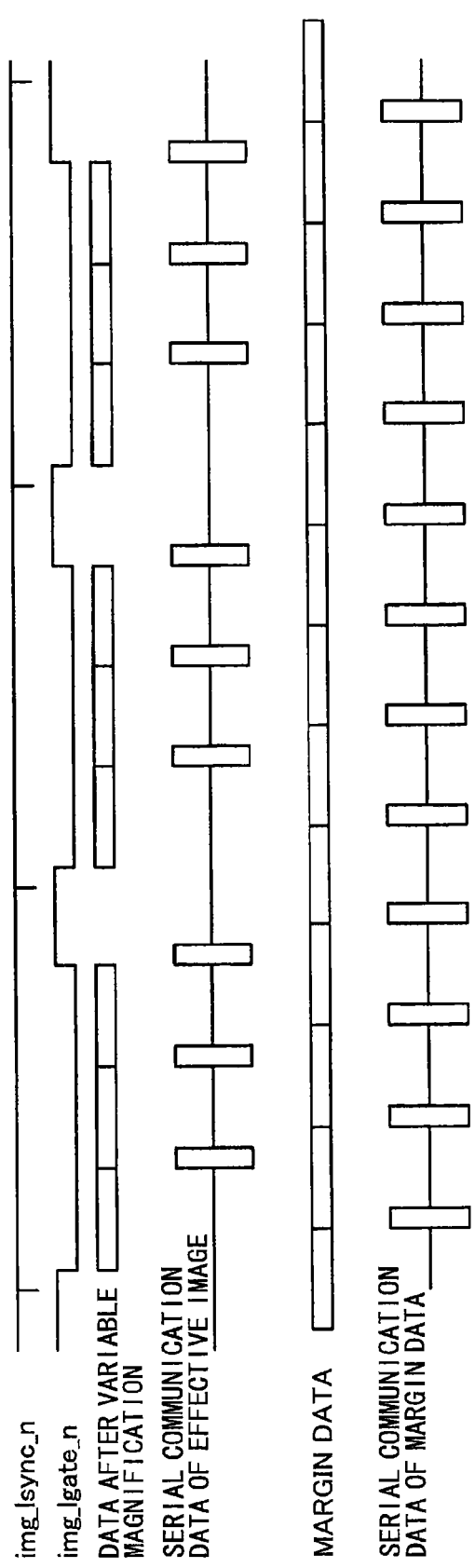

IMAGE PROCESSING APPARATUS, IMAGE PROCESSING METHOD, AND RECORDING MEDIUM

CROSS-REFERENCE TO RELATED APPLICATIONS

The present application is based on and claims the benefit of priority under 35 U.S.C §119 of Japanese Patent Application No. 2014-019136 filed Feb. 4, 2014, the entire contents of which are hereby incorporated herein by reference.

BACKGROUND OF THE INVENTION

1. Field of the Invention

The present invention generally relates to an image processing apparatus, an image processing method, and a recording medium stored an image processing program.

2. Description of the Related Art

There has been known an image forming apparatus that variably magnifies the size of a draft image and transfers image data onto a sheet having a designated size. In such an image processing apparatus, the image data are read as the data on a line basis, and the image data to be transferred onto are output on a line basis.

For example, as illustrated in FIG. 15, in a case where the size of a draft image is reduced by half (½ times), two lines of data are read from the draft image (input image) first, and the read two lines of data are variably magnified into one line of data by image processing, so that the one line of data are output and transferred.

Japanese Laid-open Patent Publication No. 2008-289021 discloses a method in which the size of the draft image is reduced similar to the above, and when a margin (black space) is formed in an image to be transferred, the margin data can be transmitted efficiently. Namely, as illustrated in FIG. 19, first and second lines of a draft image are read. Then, effective image data variably magnified into one line are transmitted and simultaneously the third line of the draft image is read. After that, the fourth line of the draft image is read and simultaneously, one line of margin data are transmitted.

According to the method of Japanese Laid-open Patent Publication No. 2008-289021, it becomes possible to read a drat image and transmit margin data at the same time, so that the processing time can be reduced.

SUMMARY OF THE INVENTION

According to an aspect of the present invention, an image processing apparatus includes an image data input unit reading an input image and acquiring input image data on a per line basis; an effective image data generation unit generating effective image data based on the input image data acquired by the image data input unit; an address generation unit generating addresses of transmission destinations of the input image data; an image data transmission unit transmitting the input image data to the transmission destinations designated by the addresses generated by the address generation unit; and an adjustment unit adjusting an operation of the image data transmission unit in a manner so that margin data can be transmitted in periods other than periods when effective image data are transmitted.

BRIEF DESCRIPTION OF THE DRAWINGS

Other objects, features, and advantages of the present invention will become more apparent from the following description when read in conjunction with the accompanying drawings, in which:

FIG. 12 illustrates an example of the transmission timings of the effective image data and the margin data according to the second embodiment of the present invention;

FIG. 13 illustrates another example of the transmission timings of the effective image data and the margin data according to the second embodiment of the present invention;

DETAILED DESCRIPTION OF THE PREFERRED EMBODIMENTS

In related technologies, in a case where the size of a draft image is changed, if the size of the sheet onto which an image is to be transferred is greater than the size of the variably-magnified image, a margin (blank space) is generated. Due to this, it becomes necessary to take additional time to transmit the margin data to compensate (form) for the margin after the transmission of effective image data. As a result, the processing time becomes longer than that when a same-size image is transferred onto a same-size sheet.

On the other hand, in a case where the size of the draft image is greater than the size of the draft sheet, even when the same-size image is transferred without variably magnifying the image, the margin is generated, so that it takes time to transmit the margin data.

In the method disclosed in Japanese Laid-open Patent Publication No. 2008-289021, it is necessary to have (establish) a time period, between when one line of image data are transmitted and the next line of the image data are transmitted, which is long enough to transmit at least one line of the image data.

Figure 16:
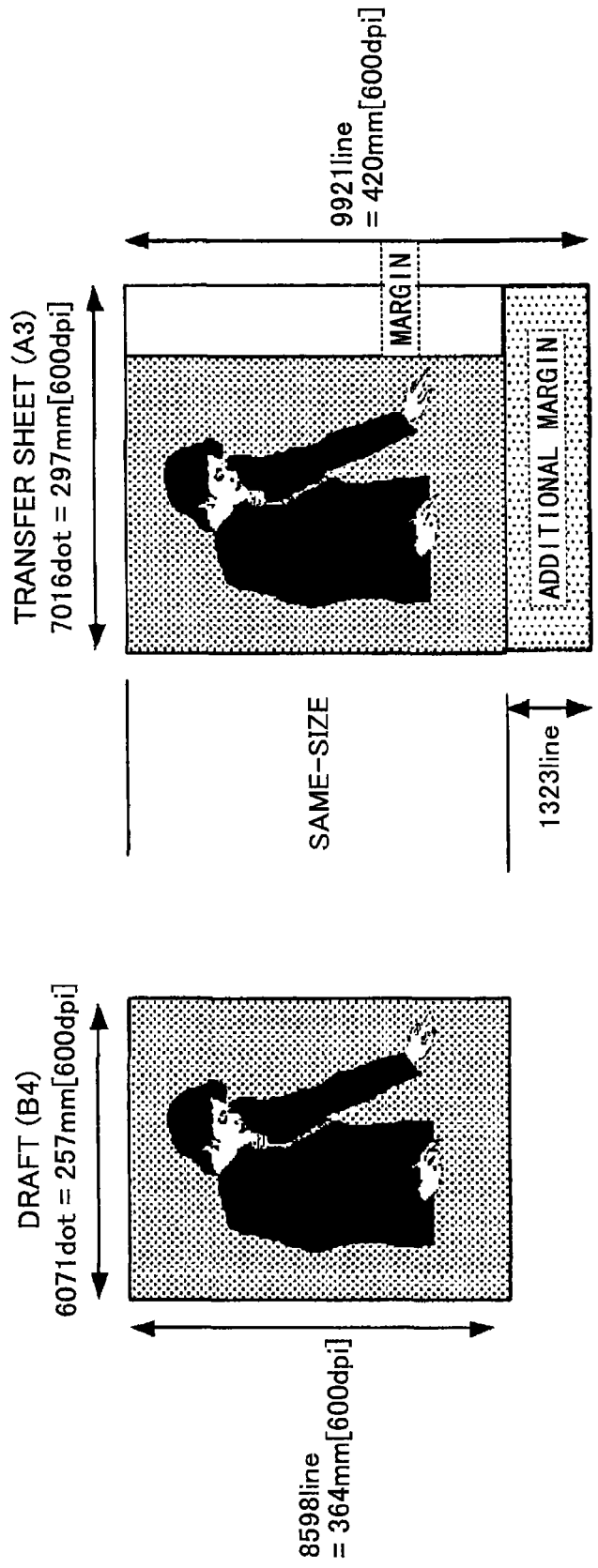
FIG. 16 illustrates an example of transferring a same-size image.

For example, as illustrated in FIG. 16, in a case where a same-size image is transferred onto a sheet having a size greater than that of the draft and a margin is generated, it is necessary to wait until the transmission of the effective image data is completed before the margin data are transmitted. Therefore, it is difficult to reduce the processing time.

Figure 19:
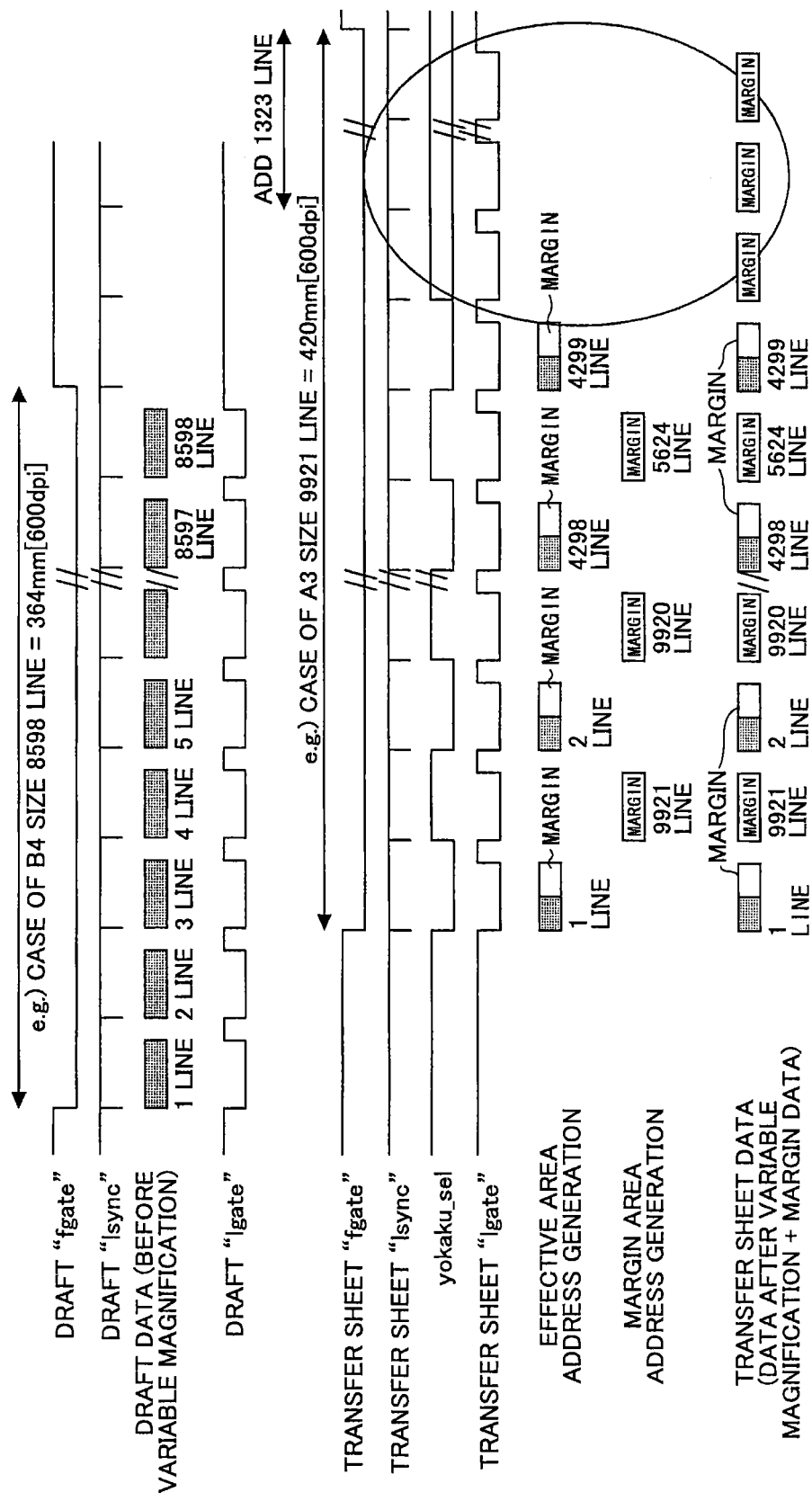
FIG. 19 illustrates an example of the transmission timings of the effective image data and the margin data in related art technologies.

Further, for example, as illustrated in FIG. 19, in the data transmission of a transfer sheet, a time period when no transmission is performed is generated from when effective image data are transmitted until when margin data are transmitted. For example, the time period corresponds to a time period from when the first line data are transmitted until when the 9921th data are transmitted in FIG. 19.

This time period is generated because it is necessary to adjust the positions of the draft and a read sensor after the reading of one line is completed, so that a difference occurs between a time period necessary for reading and a time period necessary for transmission. According to the method disclosed in Japanese Laid-open Patent Publication No. 2008-289021, the margin data are transmitted on a per line basis. Therefore, it is difficult to transmit the margin data in this time period.

The present invention in made in light of at least a problem described above, and may provide an image processing apparatus that can effectively perform a process and reduce a processing time in a case where an image is read and transferred, especially when a margin is generated (formed) in a transferred image due to the size difference of a sheet size or variable magnification performed on the image size.

Configuration and Operation of Image Processing Apparatus 1

Figure 2:
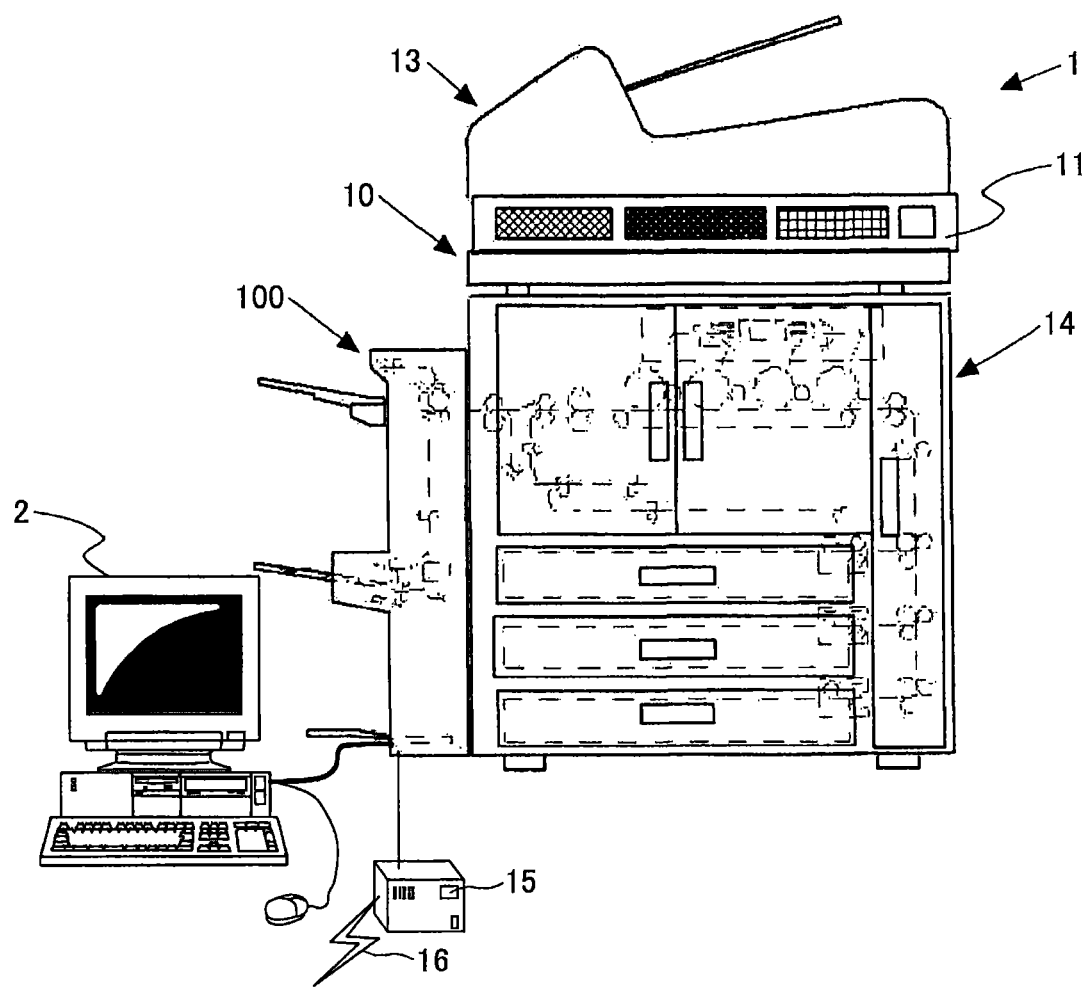
FIG. 2 schematically illustrates an example configuration of an image processing apparatus according to the first embodiment.

FIG. 2 illustrates an external appearance of an image processing apparatus 1 according to a first embodiment. The image processing apparatus 1, which may be a full-color copier, generally includes an automatic draft feeder 13, an operation board 11, a scanner 10, a printer 14, and a finisher 100 as the units thereof.

Here, the operation board 11, the scanner 10 equipped with the automatic draft feeder 13, and the finisher 100 are units that can be detached from the printer 14.

The image processing apparatus 1 is connected to a Local Area Network (LAN) which is also connected to a personal computer (PC) 2. The image processing apparatus 1 is further connected to an exchanger 16 which is also connected to a telephone line 16. The printed sheet from the printer 14 is discharged to the finisher 100.

Figure 3:
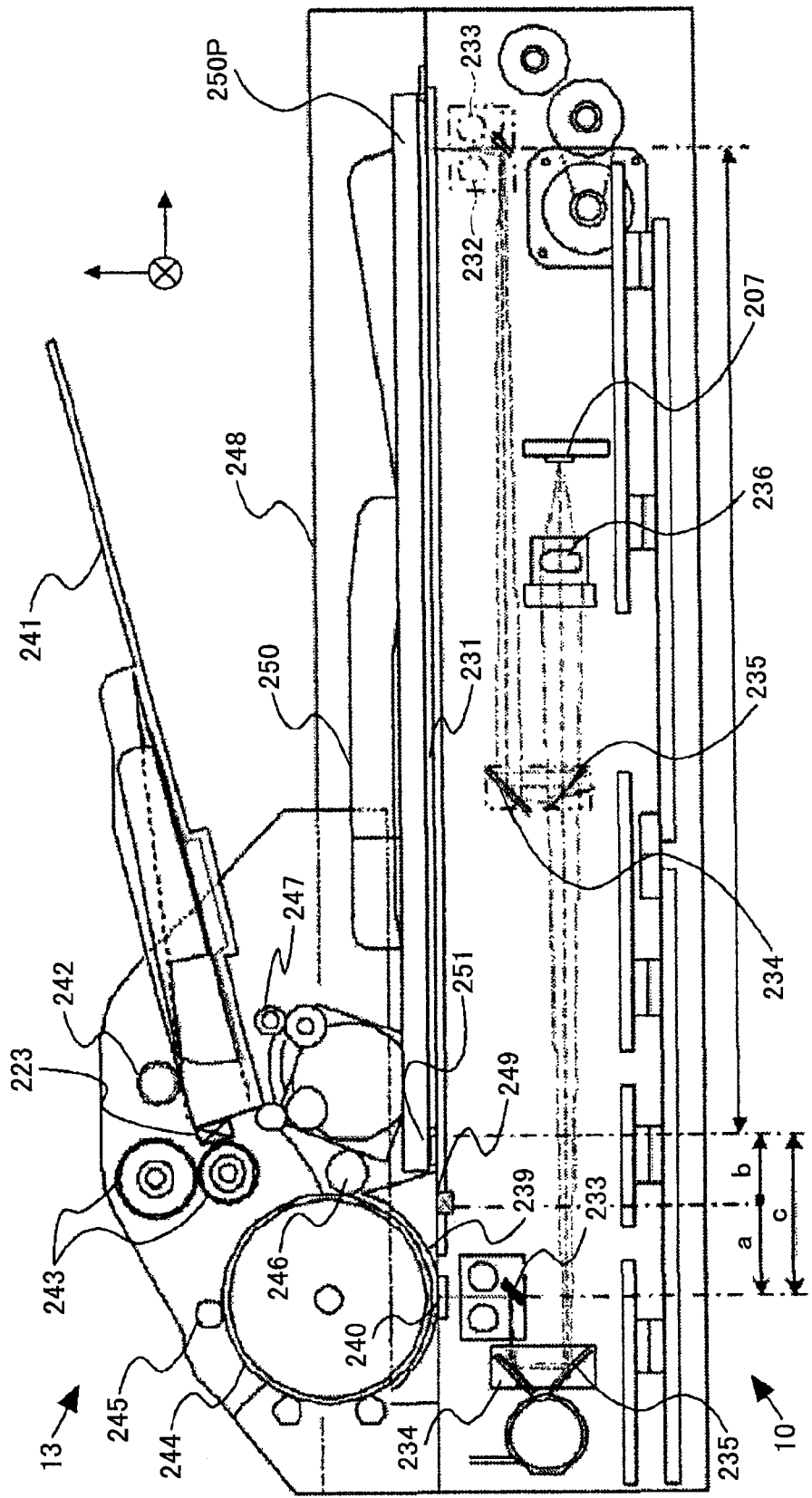
FIG. 3 illustrates an example configuration of a scanner according to the first embodiment.

FIG. 3 illustrates the scanner 10 and a mechanism of reading a draft image (draft image read mechanism) of automatic draft feeder 13 mounted on the scanner 10. A draft, which includes an input image, placed on a contact glass 231 of the scanner 10 is irradiated by an irradiation lamp 232, so that the reflected light from the draft is reflected in the direction parallel to the sub-scanning direction by a first mirror 233.

The irradiation lamp 232 and the first mirror 233 are mounted on a first carriage (not shown) which is driven in constant speed in the sub-scanning direction. A second mirror 234 and a third mirror 235 are mounted on a second carriage (not shown) which is driven in the direction same as the moving direction of the first carriage in a half speed of the first carriage.

Image light reflected by the first mirror 233 is reflected downward by the second mirror 234, and is further reflected in the sub-scanning direction by the third mirror 235, so as to be converged by a lens 236 to irradiate a charge-coupled device (CCD) 207 to be converted into an electronic signal. The first carriage and the second carriage are driven back and forth in the sub-scanning direction by using a carriage motor 238 as a drive source.

As described, the scanner 10 is a flat-bed scanner that scans a draft on the contact glass 231 using the first mirror 233, and projects the draft image onto the CCD 207.

Further, in order to perform sheet-through reading as well, the scanner 10 includes a glass 240, which serves as a sheet-through reading window, at the reading view position of the first mirror 233 when the first carriage is stopped at its home position. The automatic draft feeder 13 is disposed on the upper side of the glass (reading glass) 240, so that a feed drum 244 of the automatic draft feeder 13 faces the glass 240.

A draft placed (stacked) on a draft tray 241 of the automatic draft feeder 13 is fed between the feed drum 244 and a pressing roller 245 by a pickup roller 242 and registration rollers 243. Then, the draft is adhered to the feed drum 244 and fed on the glass 240. Then, the draft is discharged on a base body 248 under the draft tray 241 by paper ejection rollers 246 and 247.

When the draft is fed on the reading glass 240, which serves as a draft reading window, an image on a front surface of the draft is irradiated by the irradiation lamp 232, so that reflection light from the front surface of the draft is irradiated onto the CCD 207 via an optical system including the first mirror 233, etc., to be photoelectric converted therein (i.e., to be converted into RGB color image signals).

As illustrated in FIG. 3, a reference white plate 239 and a base point sensor 249 to detect the first carriage are disposed between the reading glass 240 and a scale 251 for determining a draft starting point.

Due to variations of emission intensity in the irradiation lamp 232, variations in the main-scanning direction, variations of sensitivity among pixels of the CCD 207, etc., a phenomenon of variations in read data may occur even when a draft having a uniform concentration is read. The reference white plate 239 is used to correct the phenomenon based on shading correction.

The base body 248 of the automatic draft feeder 13 is in hinge connection with the base body of the scanner 10 on the rear side of the figure, so that it is possible for a user to raise the automatic draft feeder 13 by holding a handgrip on the front side of the base body 248 of the figure and moving up the base body 248 of the automatic draft feeder 13.

On the rear side of the base body 248 of the automatic draft feeder 13, there is a switch to detect whether the automatic draft feeder 13 is open or closed. On the bottom surface part of the automatic draft feeder 13, there is provided a pressure plate 250P so as to face the contact glass 231. When the automatic draft feeder 13 is closed, the lower surface of the pressure plate 250P is in close contact with the upper surface of the contact glass 231.

Figure 4:
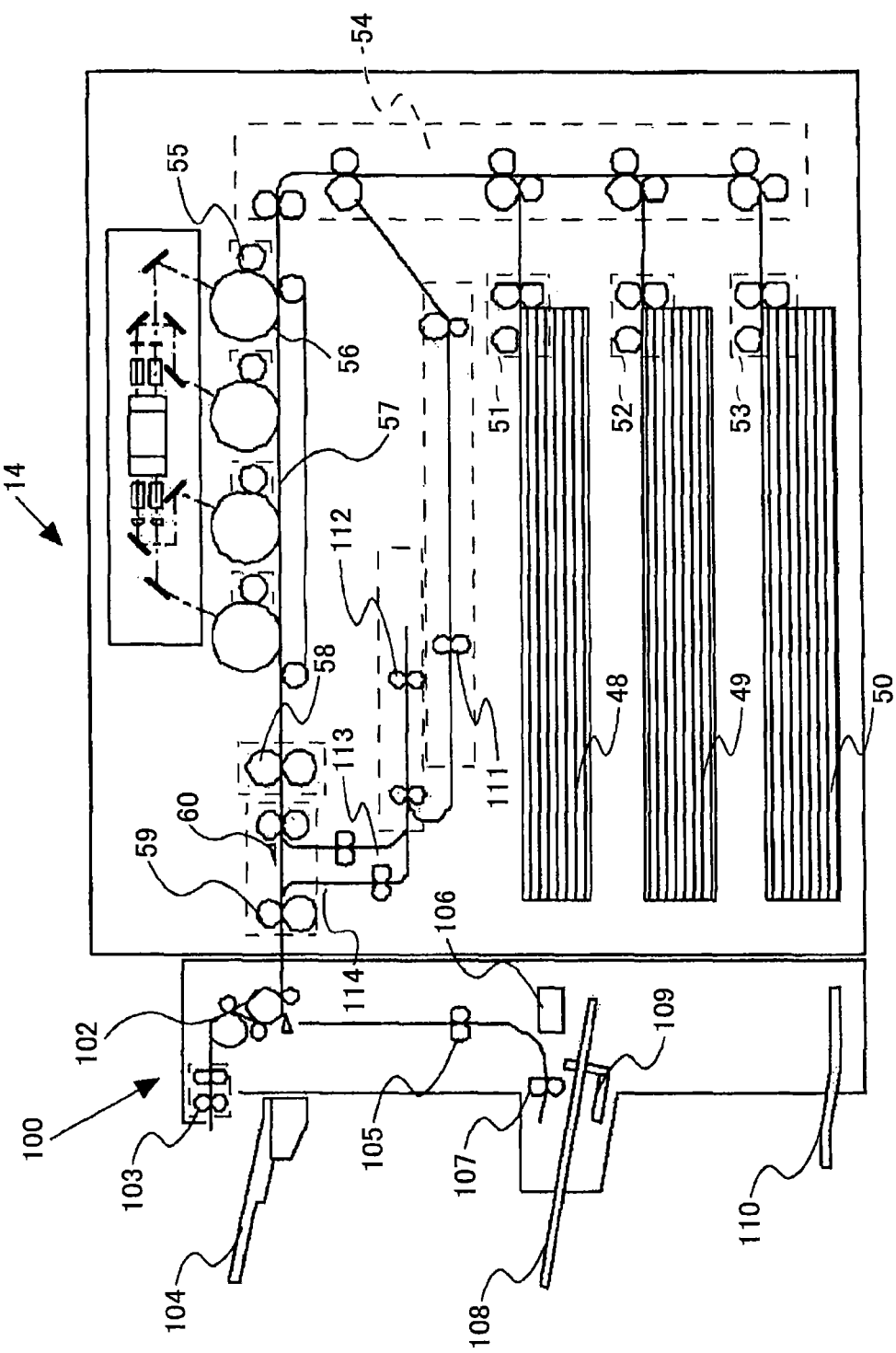
FIG. 4 illustrates an example configuration of a color printer according to the first embodiment.

FIG. 4 schematically illustrates an example mechanism of the printer 14. The printer 14 is a laser printer. There are four group bodies for forming magenta, cyan, yellow, and black color imaging. Each of the four group bodies includes a photoconductor 56 for forming a single-color toner image, a developing device 55, a charger (not shown), a cleaning device (not shown), and a transfer device. These group bodies are arranged in a tandem manner, so that toner images of those colors formed by the group bodies are sequentially superimposed and transferred onto a single transfer sheet.

The transfer sheets stacked in a first tray 48, a second tray 49, and a third tray 50 are fed by a first sheet feeding device 51, a second sheet feeding device 52, and a third sheet feeding device 53, respectively, and further fed to a position so as to face the photoconductor 56 by a vertical feeding unit 54.

Figure 15:
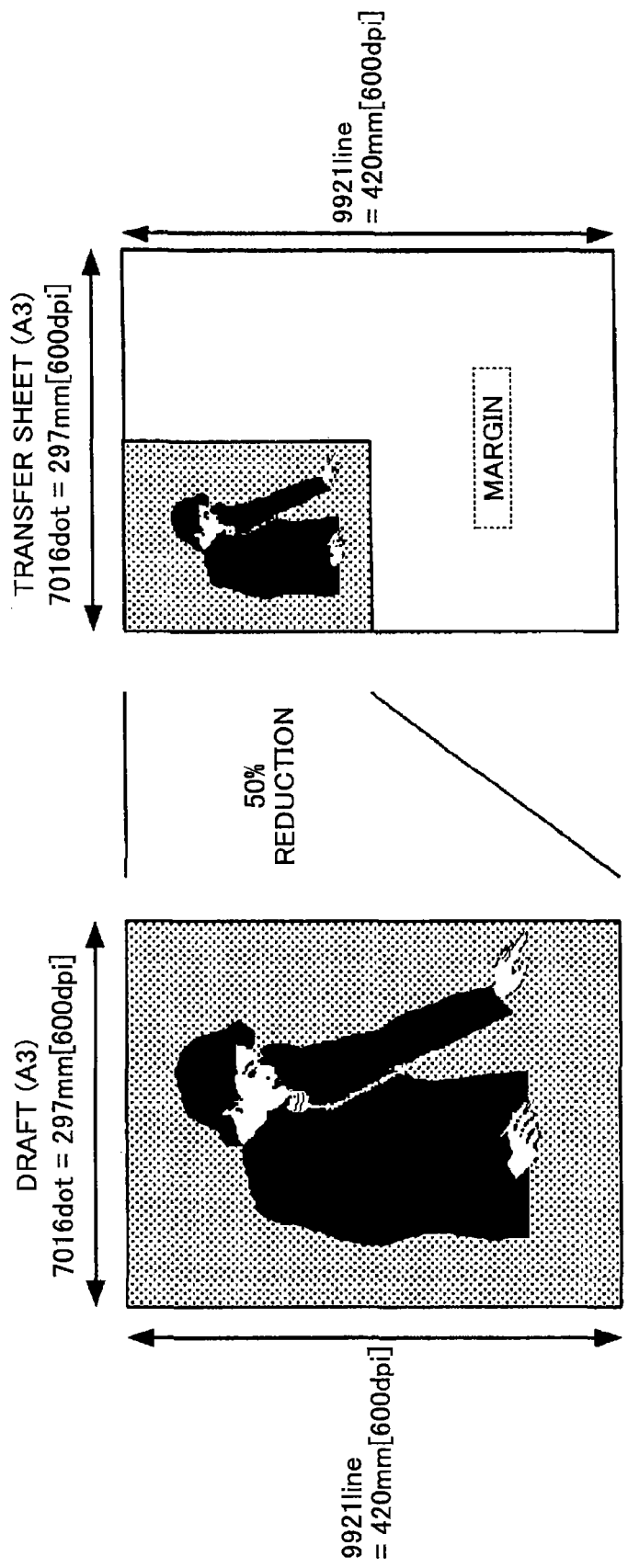
FIG. 15 illustrates an example of transferring a reduced image.

As illustrated in FIG. 15, in related art technologies, there is a disclosed method of transmitting margin data in reduced printing when the draft size is equal to the transfer sheet size. In this case, the whole image transmission time period is the same between same-size printing and reduced printing, and it is possible to reduce an interval between a previous sheet and a following sheet ("sheet interval").

However, basically, in a case where the draft size differs from the transfer sheet size, it takes additional time to transmit margin data, so that it is not possible to reduce the sheet interval.

As illustrated in FIG. 16, even in a case of same-size printing, when the transfer sheet size is greater, the additional time to transmit the margin data is necessary. Further, in a case of using a sheet-through DF, there may be a case where the line number in the sub-scanning direction is unknown, and the draft size may become smaller.

Figure 17:
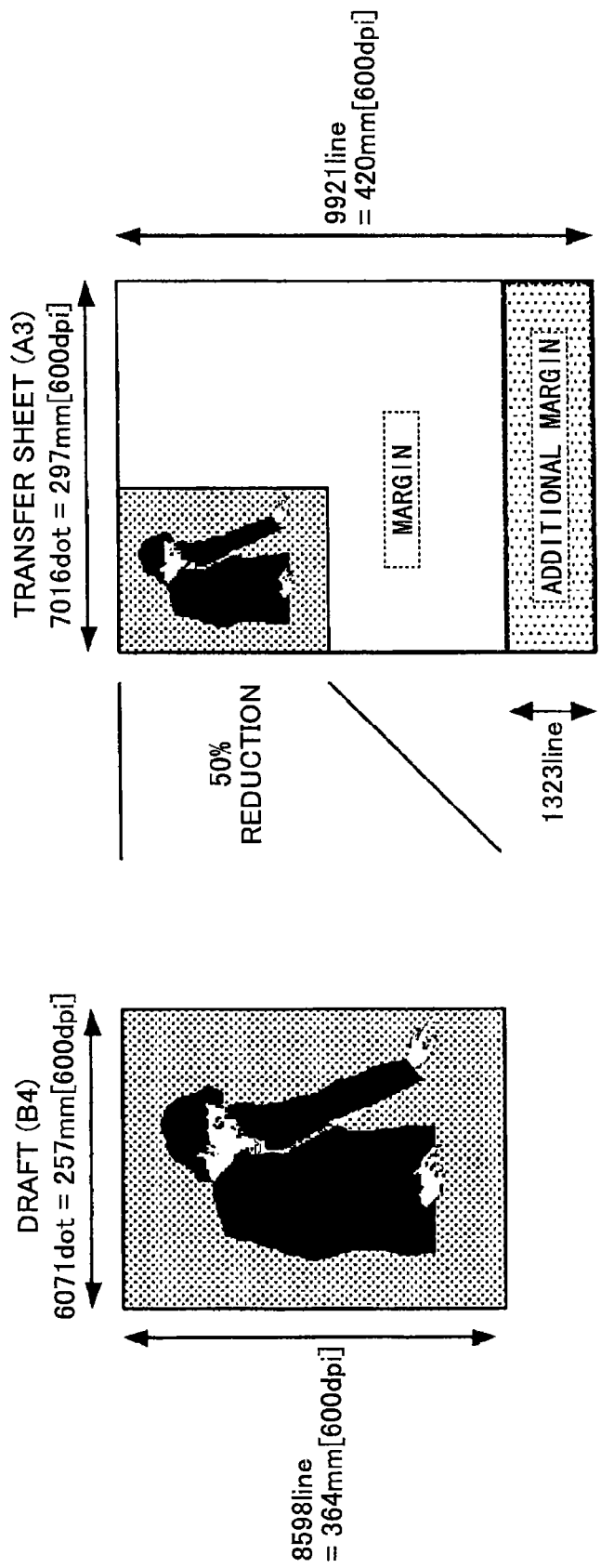
FIG. 17 illustrates another example of transferring a reduced image.
Figure 18:
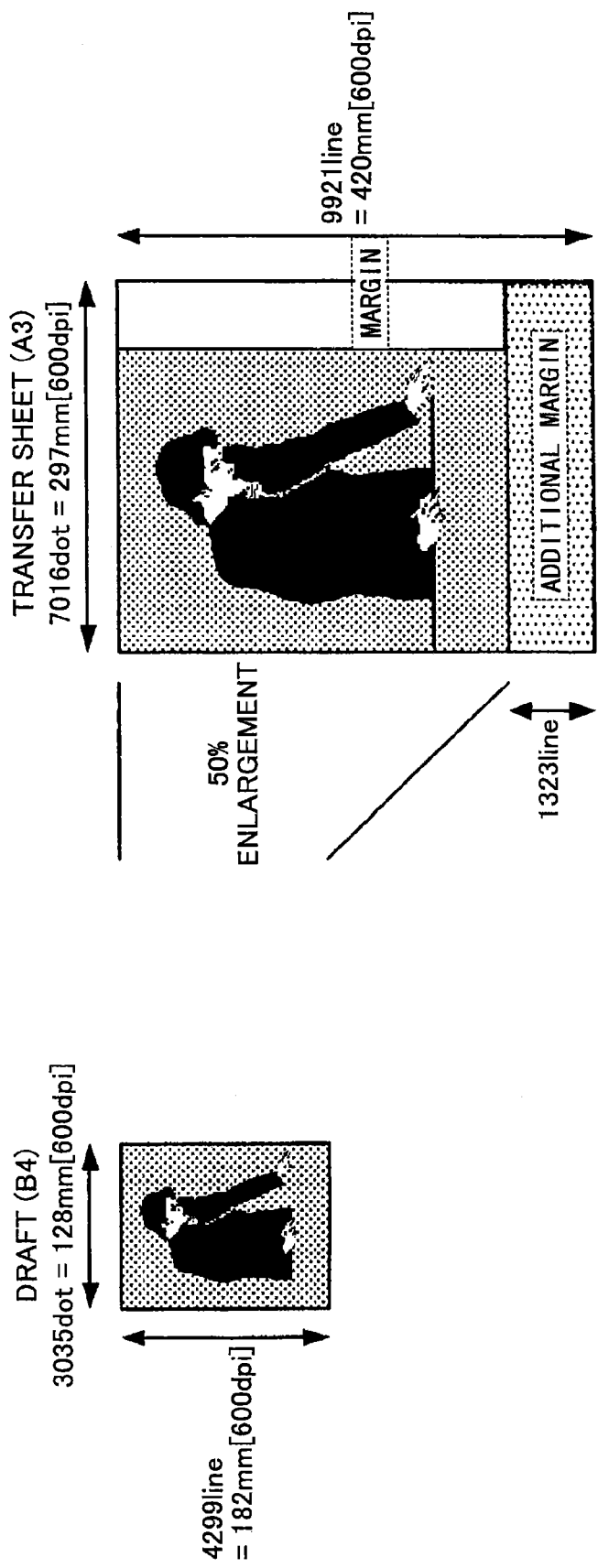
FIG. 18 illustrates an example of transferring an enlarged image.

As illustrated in FIG. 17, even in a case of reduced printing, when the transfer sheet size is greater, the additional time to transmit the margin data becomes necessary. Further, as illustrated in FIG. 18, in a case of enlarged printing as well, the additional time to transmit the margin data may become necessary.

As illustrated in FIG. 19, in related-art technologies, even after the reading of the draft image is completed, it is necessary to additionally transmit margin data, and time of the sheet interval is used. Further, it is also necessary to determine (manage) by when margin data are to be transmitted. In this regard, in related-art technologies, the draft reading size is equal to the transfer size. Therefore, no address management method is provided. Further, it is known that the transmission of margin data are conducted on a per line basis.

Figure 5:
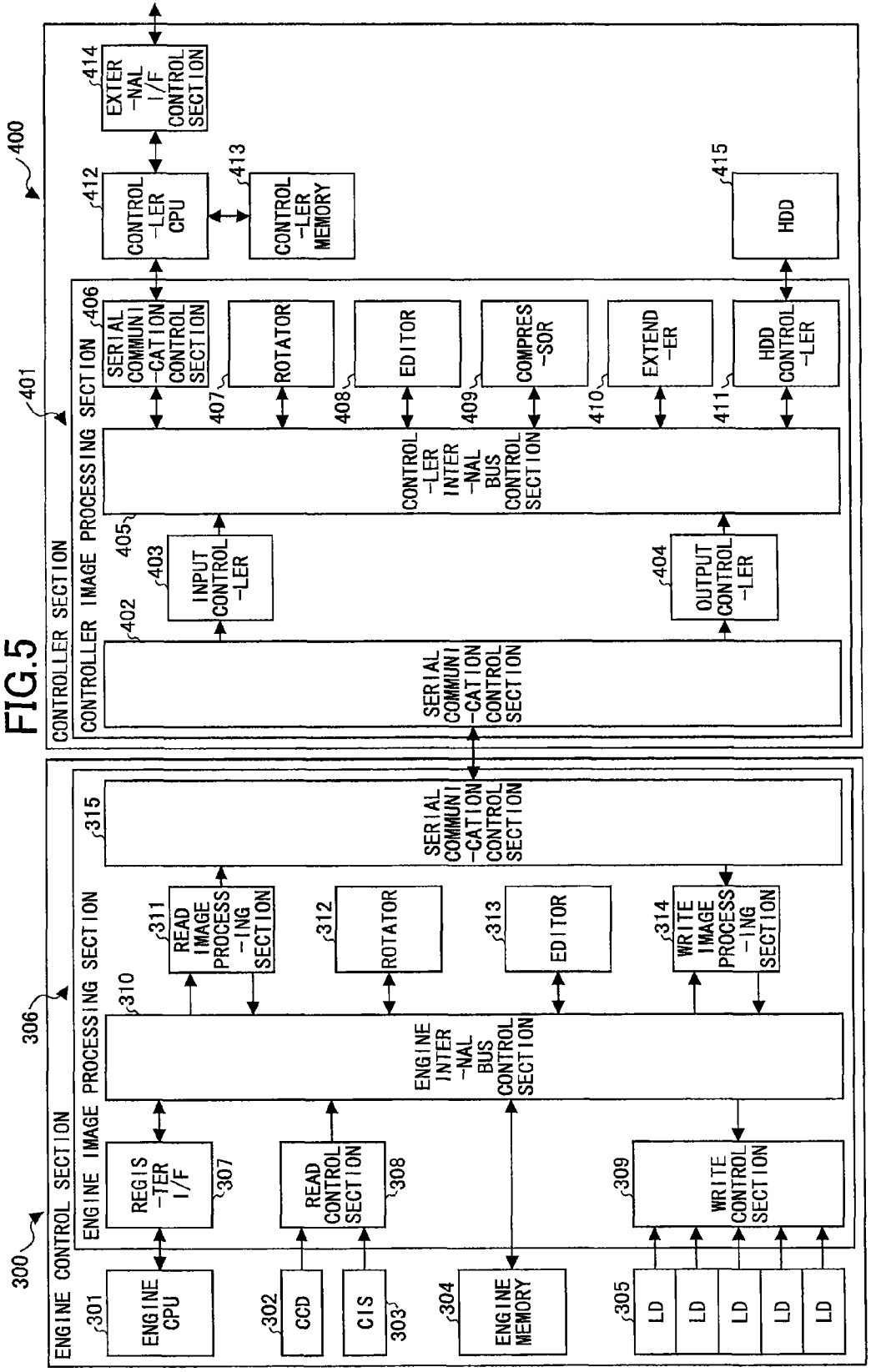
FIG. 5 is a block diagram illustrating an example configuration according to the first embodiment.

FIG. 5 is a block diagram of an example configuration of the image processing apparatus 1. An engine control section 300 controls a reading unit and a writing unit, and performs image processing. An engine CPU 301 performs engine control. A register I/F 307 is an interface provided between an engine image processing section 306 and the engine CPU 301.

A controller section 400 receives print data from an external I/F, distributes a scanner image, and stores image data. A read control section 308 controls a CCD 302, a contact image sensor (CIS) 303, and a camera image reading section using the CCD 302 and the CIS 303. By having two CCDs 302 and two CISs 303, it becomes possible to perform double-sided simultaneous-reading. A write control section 309 outputs an image from an engine memory 304 to laser diodes (LDs) 305.

An engine internal bas control section 310 performs bus switching and bus adjustment between the read control section 308, the write control section 309, a read image processing section 311, which is an example of a claimed "effective image data generation unit", a write image processing section 314, and the engine memory 304. The engine memory 304 temporarily stores a front-surface image and a rear-surface image from the read control section 308, and a print image after total volume control processing from the write image processing section 314.

The read image processing section 311 performs processes on acquired input image data, the processes including an MTF correction on a read image, smoothing filter correction, a color correction from RGB image to CMYK image, variable magnification on a read image, and coding and compression processes on read image data.

The write image processing section 314 performs decoding and extension processes on CMYK normal color image data, and performs a gradation process on the normal color image data. Further, image processing section 314 performs resolution conversion and variable magnification on stamp image data, pattern image data, and transparent color image data, an image shift process on versions, a composing process on image data, and total volume control processing of toner use amount.

Serial communication control sections 315 and 402 connect the engine control section 300 and the controller section 400 based on a fast serial I/F such as PCI-Express, etc. A controller image processing section 401 includes an input controller 403 to receive image data from the engine and an output controller 404 to transmit image data to the engine.

A serial communication control section 406 connects between the controller image processing section 401 and a CPU (controller CPU) 412. A rotator 407 and an editor 408 performs image processing on an print image and a read image. A compressor 409 performs data compression when the print data or the read data are stored. An extender 410 performs decompression on compressed stored data to original image data.

A hard disk drive (HDD) 415 for storing data is controlled by an HDD controller 411. A controller internal bus control section 405 performs bus switching and bus adjustment between those functional blocks.

The controller CPU 412 controls the controller section 400, renders print data, draws a print image, a stamp image, a pattern image, and a transparent color image, and performs compression process to JPEG data and extension process from JPEG data to an image.

A controller memory 413 temporarily stores received print data, serves as a work memory for a print image, a stamp image, a pattern image, a transparent color image, and a read image, and stores a program.

An external I/F control section 414 is an I/F control section to connect to an external device via a network, and controls the interface for outward image transmission and inward print data input.

Figure 6:
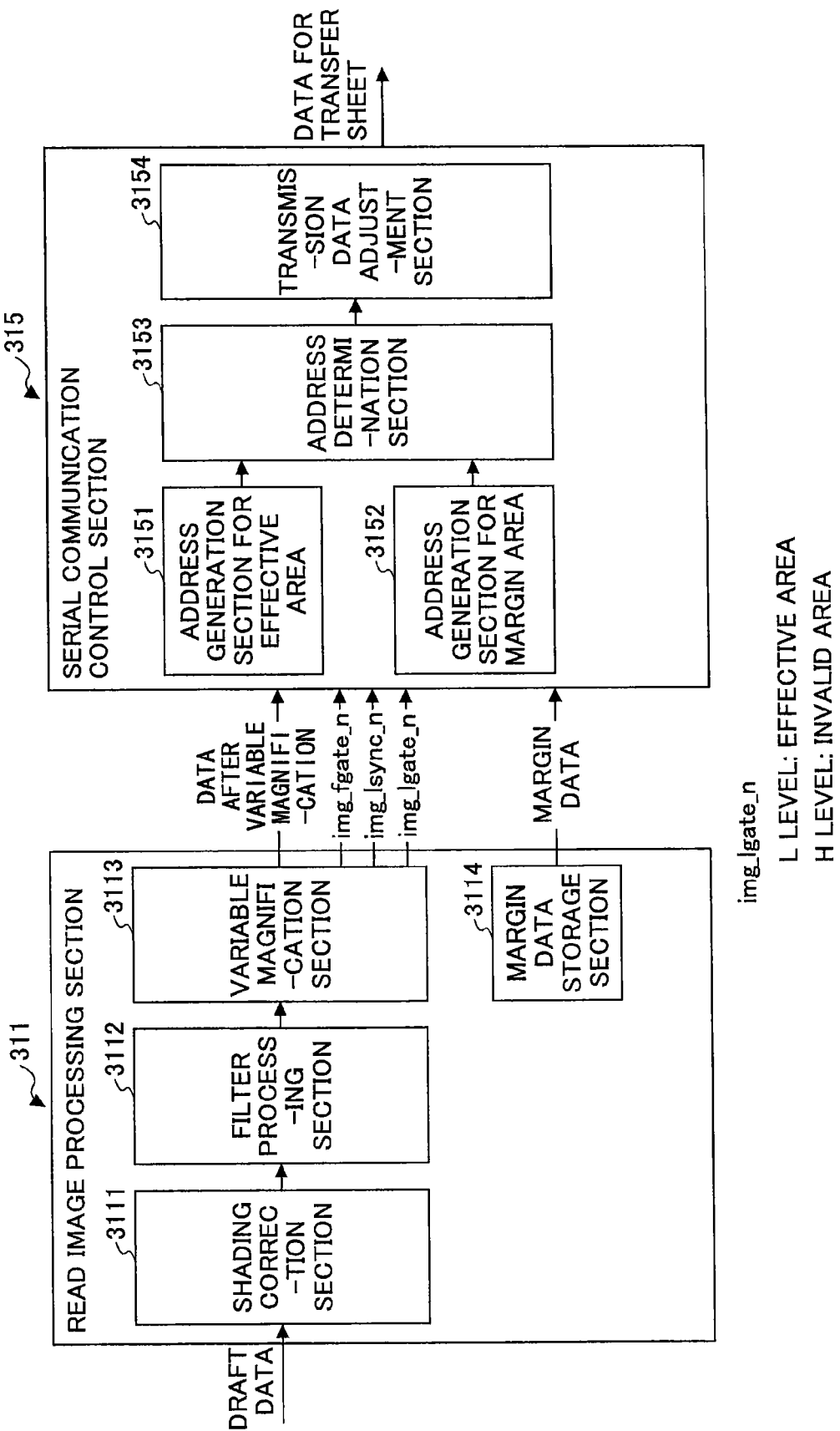
FIG. 6 is a block diagram illustrating an example configuration of a part that transmits image data according to the first embodiment.

FIG. 6 illustrates in detail the read image processing section 311 and the serial communication control section 315 of FIG. 5 serving as image data transmission means. The read image processing section 311 includes a margin data storage section 3114 to transmit margin data separately from the effective image data. Further, the serial communication control section 315 includes an address generation section 3152 as address generation means to generate the address of transmission destination of the margin data.

The effective image data are transmitted in an effective period (effective image period) in accordance with controls signals "img_fgate_n", "img_lsync_n", and "img_lgate_n". In a period other than the effective image period, margin data are transmitted. The transmission of the effective image data and the transmission of the margin data start at the same time, and the transmission of the margin data is allocated in a period when the control signal "img_lgate_n" is "H". The allocation is performed by a transmission data adjustment section 3154.

Further, the address for the margin data is generated in the order opposite to the order of generating the address for the effective image data. Namely, an output image is formed in a manner so that the margin data are formed (buried) on a transfer sheet area in the direction opposite to the direction of forming the effective image data in the sub-scanning direction.

Figure 1:
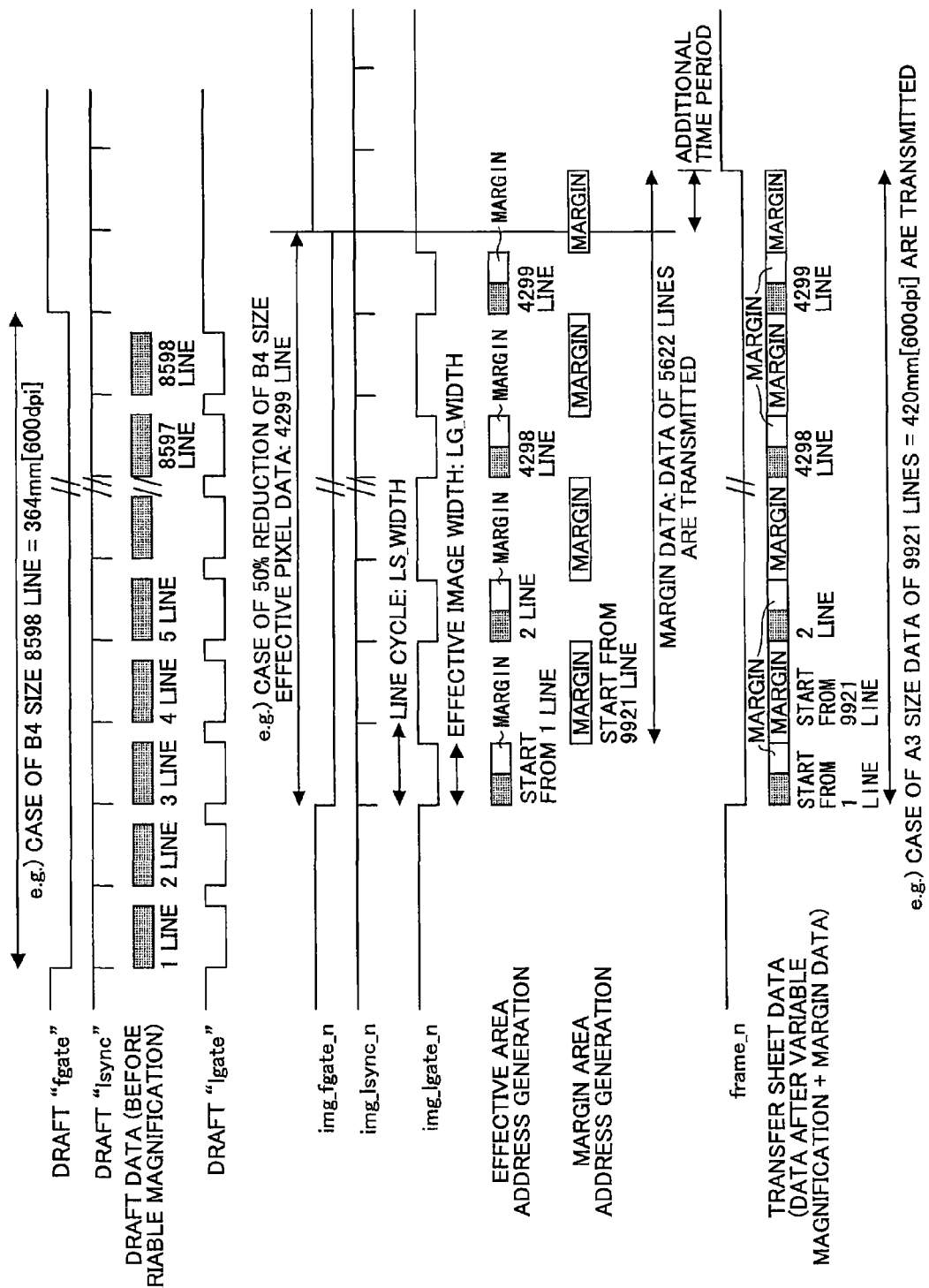
FIG. 1 illustrates an example of transmission timings of effective image data and margin data according to a first embodiment of the present invention.

FIG. 1 illustrates example transmission timings of the effective image data and the margin data in 50% reduced printing. Due to 50% reduced printing, the effective image data are transmitted on a per line basis. In B4 draft reading, 4299 lines are transmitted in draft fgate 8598 lines.

As illustrated in FIG. 1, the margin data are transmitted in periods, other than effective image data transmission periods, when the control signal "img_lgate_n" is "H" without line synchronization on a pixel basis. In a case where the size of the transfer sheet is A3, the transmission of the margin data starts from 9921 line and are formed (buried) in the direction opposite to the direction of the effective image data.

In a case of 50% reduction from B4 draft to A3 transfer sheet, when a line cycle is 7600 pixels and an effective image width is 7016 pixels, it becomes possible to add a time period, which corresponds to 584 pixels (i.e., blanking period), for transmitting the margin data.

Accordingly, it becomes possible to transmit 4299×7016+ (8598×584) pixels of margin data while 4299×7016 pixels of effective image data are transmitted. In the case of B4 draft reading period, 7600×8598=65344800 pixels of margin data can be transmitted. This corresponds to 65344800/7016 lines in A3 transfer sheet, so that 9921-9313=608 lines of margin data can be transmitted after draft reading is completed. Accordingly, it becomes possible to reduce from the time period for additionally transmitting 1323 lines in related art technologies to a time period for transmitting 608 lines.

Figure 7:
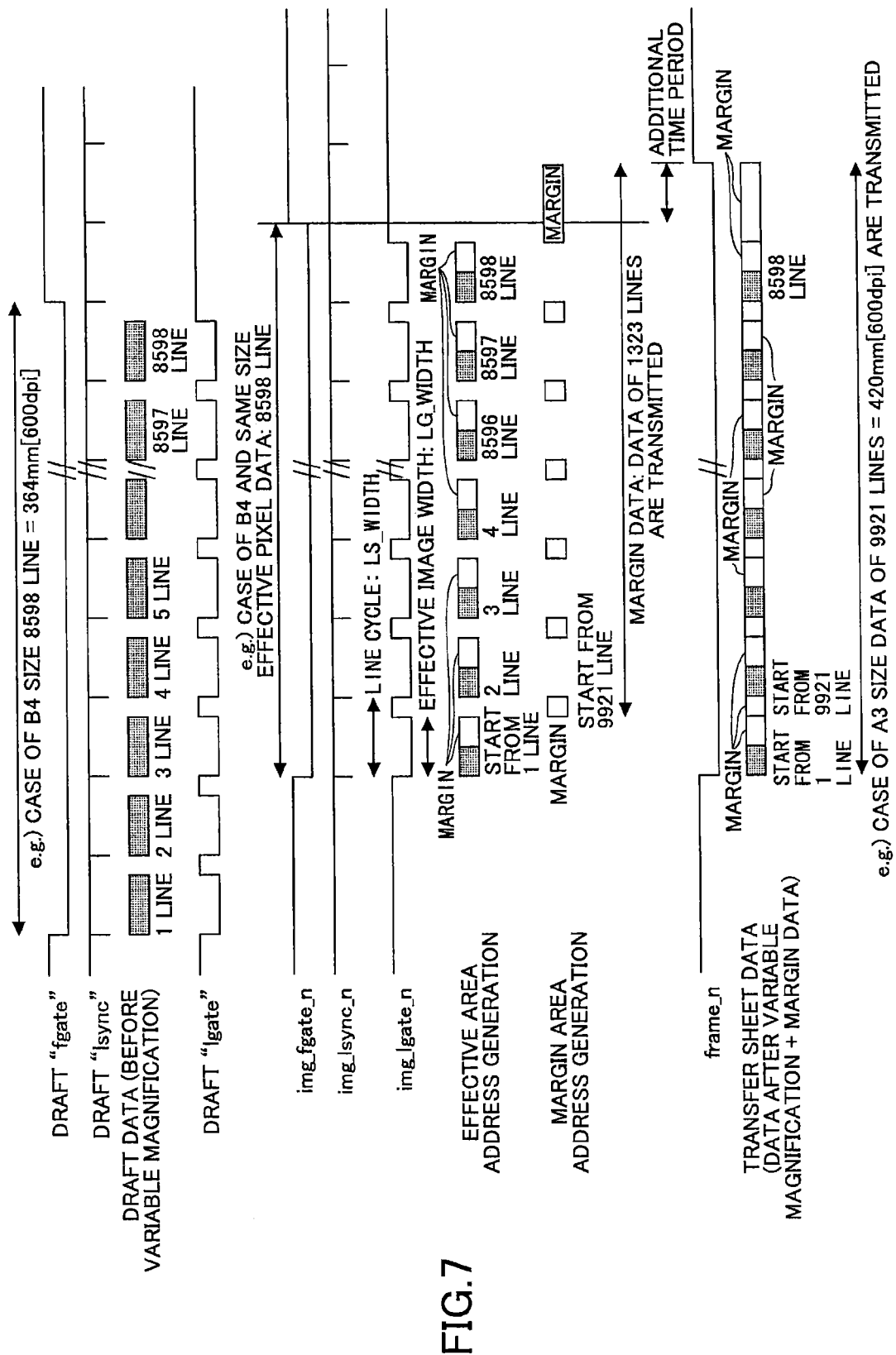
FIG. 7 illustrates another example of the transmission timings of the effective image data and the margin data according to the first embodiment of the present invention.

FIG. 7 illustrates example timings in case of same-size printing. The additional time to transmit the margin data is the time period corresponding to the 608 lines, which is the same as in the reduced printing. Namely, it becomes possible to reduce the time period compared to the time period of 1323 lines in related art technologies. Further, in in enlarged printing as well, one line of the effective image data after variable magnification are transmitted in one line cycles with "img_l-sync_n" synchronization, so that the transmission timing becomes the same as that in the same-size printing. Further, the margin data in the main-scanning direction are transmitted in a manner so that the margin data are includes in the effective image width as a part of the effective image data.

Figure 8:
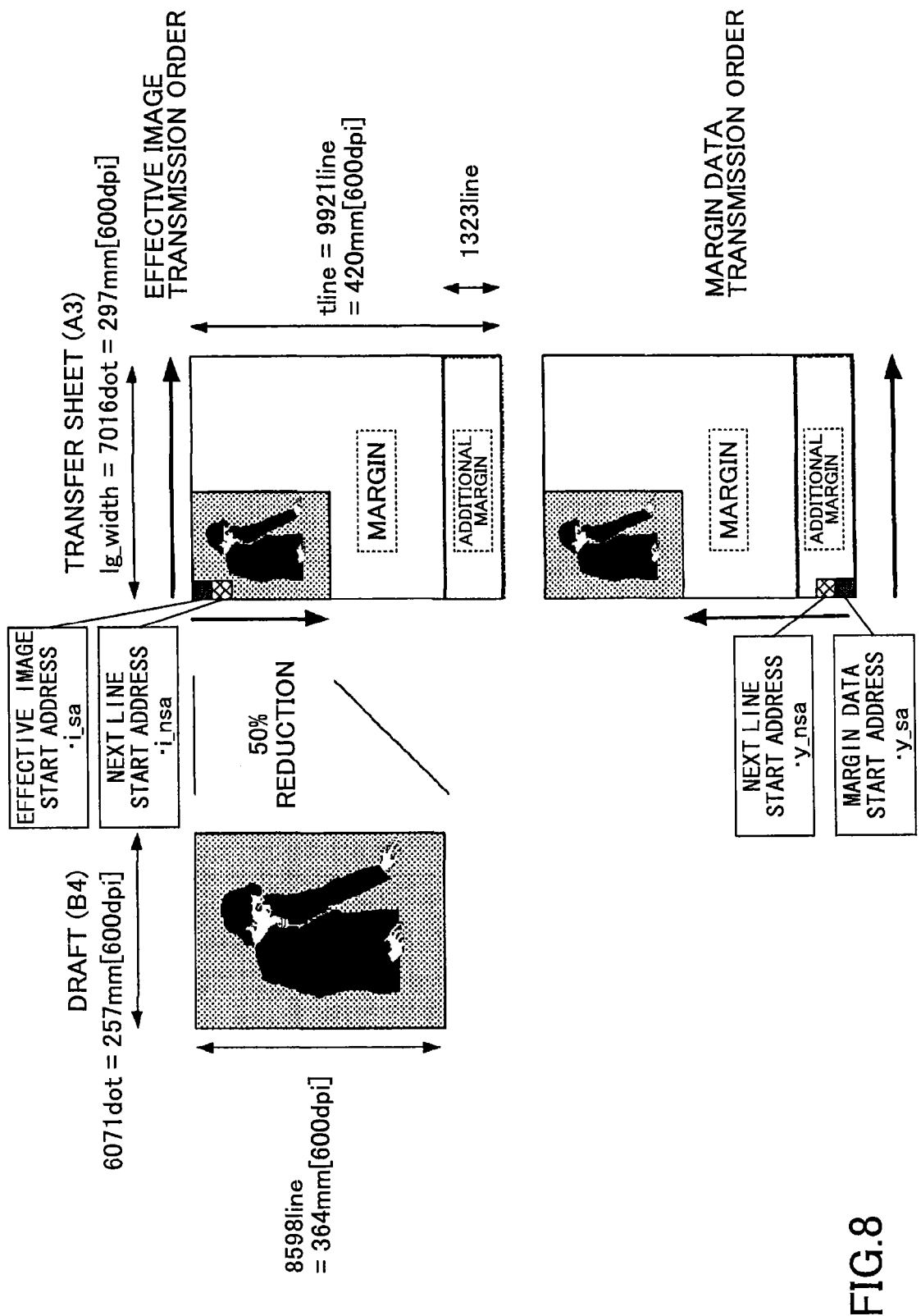
FIG. 8 illustrates an address generation method of the effective image data and the margin data according to a first embodiment of the present invention.

An address generation method is described with reference to FIG. 8. The order of generating the address of the effective image data is opposite to and the same as the order of generating the address of the margin data in the sub-scanning direction and the main-scanning direction, respectively. Whether the margin data are to be written in the next line is determine on a per line basis. In this method, the following addresses "i_ca" and "y_ca" are generated. Here, the "lg_width" and "tline" denote the width in the main-scanning direction and the line number in the sub-scanning direction, respectively. Further, when 180 degrees are rotated, the generation direction of the address is reversed.

Figure 9:
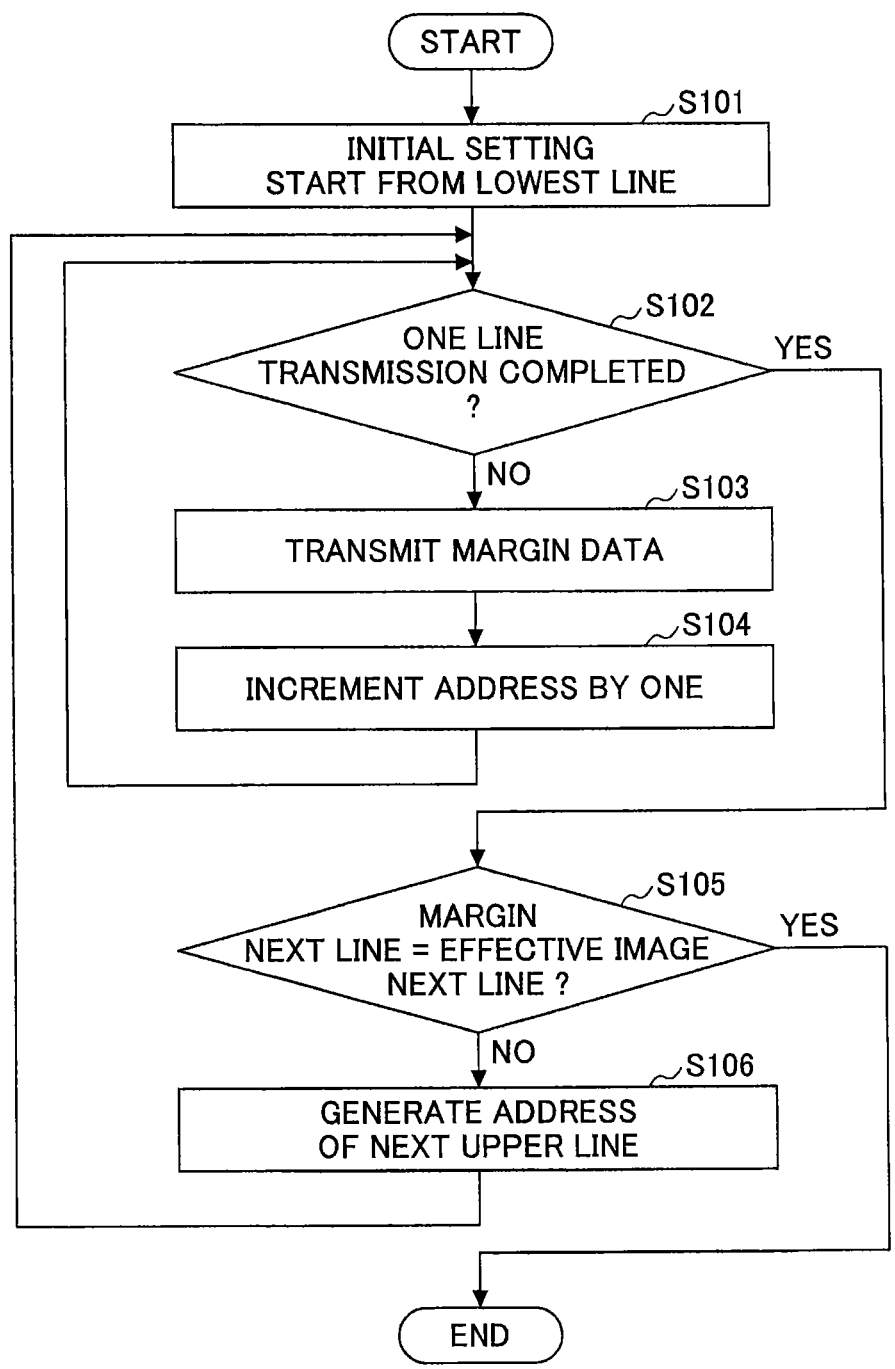
FIG. 9 is a flowchart of an example operation according to the first embodiment.

Current start address of effective image: i_sa;
Next line start address of effective image: i_nsa=i_sa+ lg_width
Current address of effective data: i_ca=i_nsa
Current start address of margin data: y_sa=i_sa+lg_width× (tline−1)
Next line start address of margin data: y_nsa=y_sa−lg_width
Current address of margin data: y_ca=y_nsa The address generation method is further described with reference to a flowchart of FIG. 9. First, an initial value is set in a manner so that the margin transmission start line is set to the lowest line (step S101). It is determined whether the transmission of one line of data is completed (step S102). When not completed (NO in step S102), margin data are transmitted (step S103), and the address is increased by one in the main-scanning direction (step S104).

When one line of transmission is completed (YES in step S102), the margin next line start address is compared with the current line start address of the effective image (step S105). When the addresses are the same (YES in step S105), the transmission of the margin data is finished. When the addresses are different (NO in step S105), the margin current line start address is updated to the next upper line (step S106).

Figure 10:
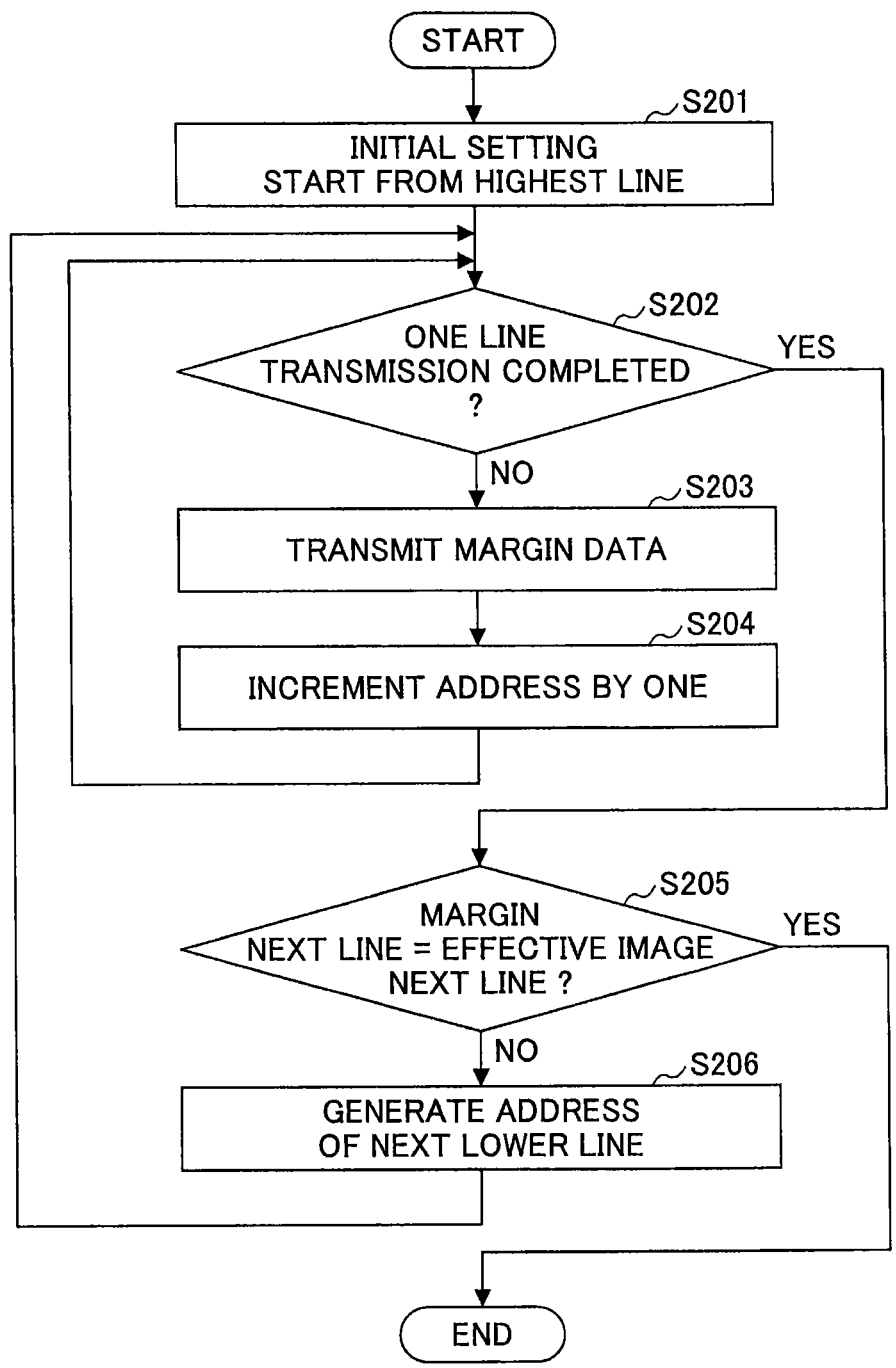
FIG. 10 is a flowchart of another example operation according to the first embodiment.

FIG. 10 is a flowchart of the address generation method when 180 degrees are rotated. When compared with the case of FIG. 9, the line to start transmission and the direction in which the line is changed after one line transmission is finished are different.

First, an initial value is set in a manner so that the margin transmission start line is set to the highest line (step S201). It is determined whether the transmission of one line of data is completed (step S202). When not completed (NO in step S202), margin data are transmitted (step S203), and the address is increased by one in the main-scanning direction (step S204).

When one line of transmission is completed (YES in step S202), the margin next line start address is compared with the current line start address of the effective image (step S205). When the addresses are the same (YES in step S205), the transmission of the margin data is finished. When the addresses are different (NO in step S205), the margin current line start address is updated to the next lower line (step S206).

Operation, Function, and Effect in Image Data Transmission in Second Embodiment

Figure 11:
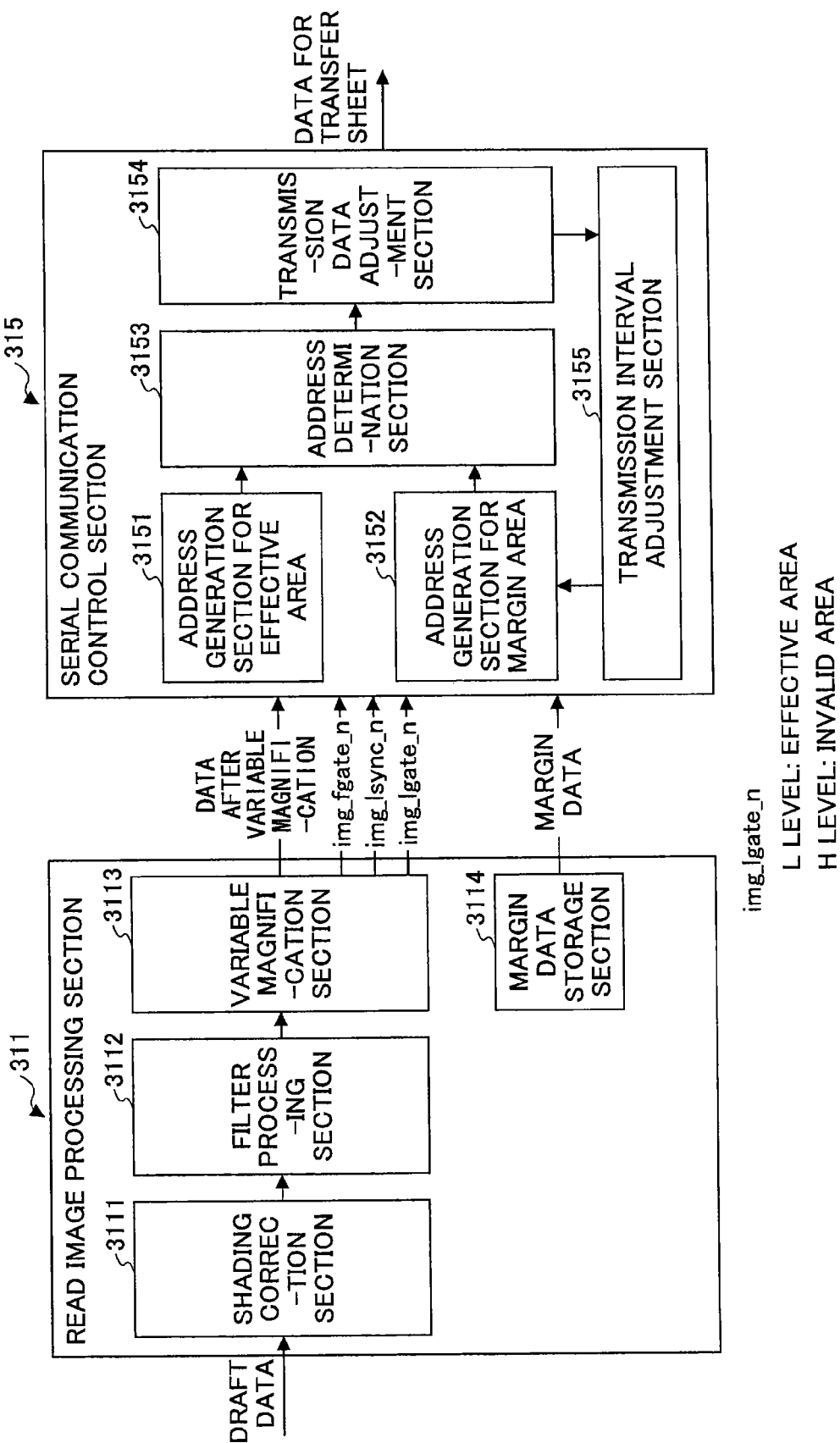
FIG. 11 is a block diagram illustrating an example configuration of a second embodiment of the present invention.

FIG. 11 illustrates in detail the read image processing section 311 and the serial communication control section 315 of the image processing apparatus 1 according to a second embodiment. In the second embodiment, a transmission interval adjustment section 3155 is added compared with the first embodiment. An operation of the transmission interval adjustment section 3155 is described.

As illustrated in FIG. 12, when an I/F such as PCIe etc., used in the serial communication control sections 315, the data transmitted from the serial communication control sections 315 are finely divided into packets based on the designated payload size.

Figure 14:
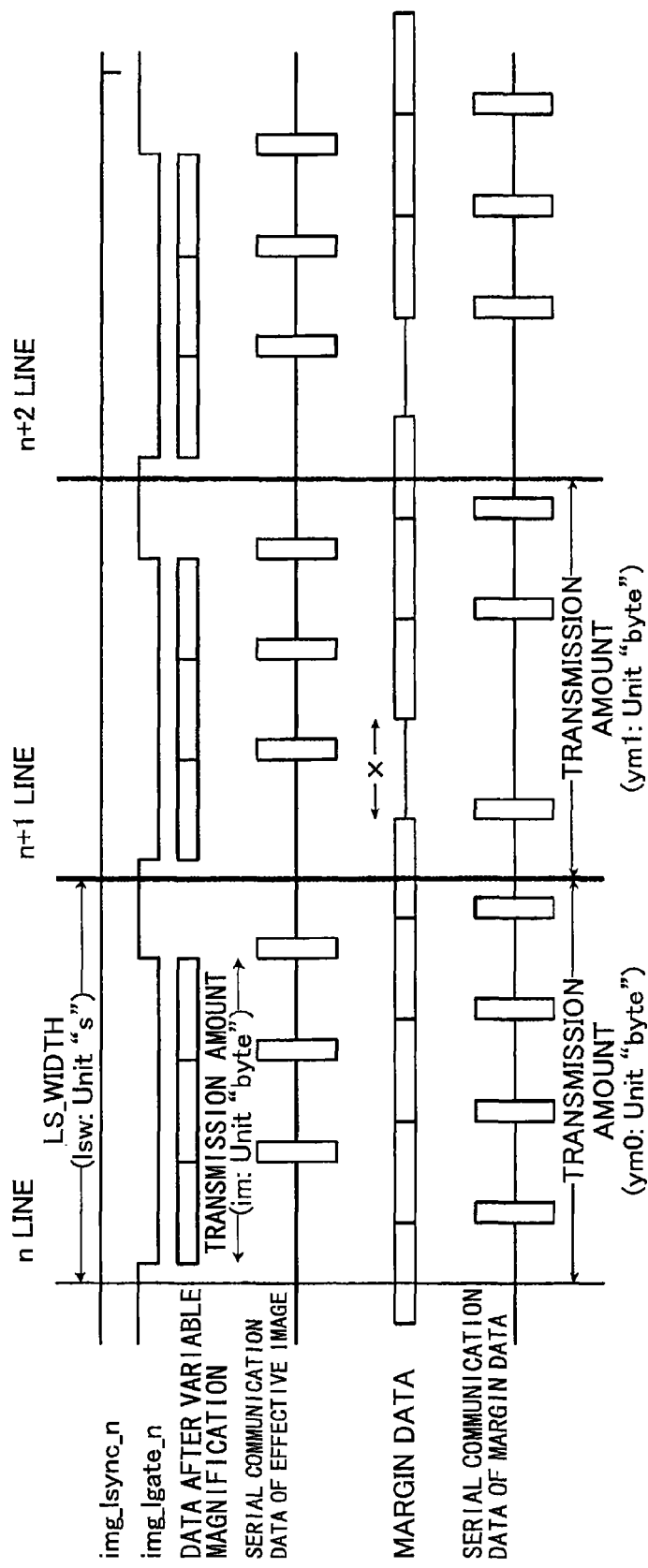
FIG. 14 illustrates still another example of the transmission timings of the effective image data and the margin data according to the second embodiment of the present invention.

As illustrated in FIG. 14, in the margin transmission in the second embodiment, margin data packet is transmitted between effective image data packets. The packet intervals are adjusted by the transmission data adjustment section 3154. The original data of the margin data are transmitted on the payload size basis.

A transmission amount of an effective image ("im" unit: byte) and a transmission amount of margin data ("ym" unit: byte) in a predetermined time period ("lsw" unit: s) are measured and compared with an upper limit transmission amount that can be transmitted with plural packets in serial communication at one time ("limit_a" unit: byte). Then when formula im+ym0>limit_a is satisfied, an adjustment is made by adding a weight interval "x" to the "n+1" line so that equation "s=0" is satisfied by reducing the margin data transmission amount by a difference "s"=im+ym0−limit_a. In this case, "x" denotes a setting value which is converted from the difference "s" into the number of margin data. In a case where 1 pixel is 1 byte, the following is satisfied.

The difference "s(byte)"=interval×(pixel)

As illustrated in FIG. 14, in "n" line, the transmission amount exceeds maximum transmission amount. However, by using a toggle buffer in the transmission interval adjustment section 3155, it becomes possible to cancel the overflow in the "n" in the "n+1" line so as to avoid transmission failure. As described, by adjusting the margin data transmission by the transmission interval adjustment section 3155, it becomes possible to effectively perform serial communications of the margin data.

Note that the operations of the image processing apparatus 1 according to first and second embodiments may be executed by an image processing program installed in a terminal, etc., connected to the image processing apparatus 1.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an image data input unit configured to sequentially read an input image line-by-line in a main scanning direction and acquire input image data on a per line basis, the input image including a margin region; and
    an image data transmission unit configured to transmit effective image data of the input image to transmission destinations indicated by designated addresses, the image data transmission unit further configured to transmit margin pixel data, which is image data corresponding to the margin region, in periods other than periods when the effective data is transmitted.

2. The image processing apparatus according to claim 1, further comprising:
    an address generation unit configured to generate addresses of transmission destinations of the input image data;
    wherein the address generation unit is configured to generate the addresses in a manner so that a direction in which addresses of transmission destinations of the effective image data change is opposite to a direction in which addresses of transmission destinations of the margin pixel data change in a sub-scanning direction.

3. The image processing apparatus according to claim 2, wherein the image data transmission unit is configured to transmit the input image data by separating the input image data into the effective image data and the margin pixel data into separate packet data and transmitting the respective packet data.

4. The image processing apparatus according to claim 3, further comprising:
    a margin data transmission amount adjustment unit configured to adjust a transmission amount of the margin pixel data,
    wherein the image data transmission unit is configured to collectively transmit a plurality of packets at one time based on a predetermined transmission amount upper-limit that can be transmitted at one time, and
    wherein the margin data transmission amount adjustment unit is configured to adjust the transmission amount of the margin pixel data in a manner so that the image data transmission unit collectively transmits the packets at one time so as not to exceed the predetermined transmission amount upper-limit.

5. The image processing apparatus according to claim 1, wherein:
    the margin data corresponds to data of lines which differ from lines that are read by the image data input unit.

6. The image processing apparatus according to claim 5, further comprising:
    an address generation unit to generate the addresses of the transmission designations of the image data,
    wherein the address generation unit is configured to generate the addresses such that a direction in which addresses of transmission destinations of the effective image data change is opposite to a direction in which addresses of transmission destination of the margin data change in a sub-scanning direction.

7. The image processing apparatus according to claim 6, further comprising:
    a comparator which compares an address of a next line of the margin region with an address of the effective image data,
    wherein when the address of the next line of the margin region is determined by the comparator to correspond to the address of the effective image data, the transmission of the margin data is finished.

8. The image processing apparatus according to claim 1, further comprising:
    an adjustment unit configured to adjust an operation of the image data transmission unit.

9. The image processing apparatus according to claim 1, further comprising:
    an effective image data generation unit configured to generate the effective image data based on the input image data acquired by the image data input unit.

10. An image processing method comprising:
    an image data input step of sequentially reading an input image line-by-line in a main scanning direction and acquiring input image data on a per line basis, the input image including a margin region;
    an image data transmission step of transmitting effective image data of the input image to transmission destinations indicated by designated addresses, the image data transmission step further for transmitting margin pixel data, which is image data corresponding to the margin region, in periods other than periods when the effective data is transmitted.

11. A non-transitory recording medium storing a program causing a computer to execute the image processing method according to claim 10.

* * * * *